KNIT GARMENT AND METHOD OF MANUFACTURE
Original Filed Jan. 10, 1969 2 Sheets-Sheet 1
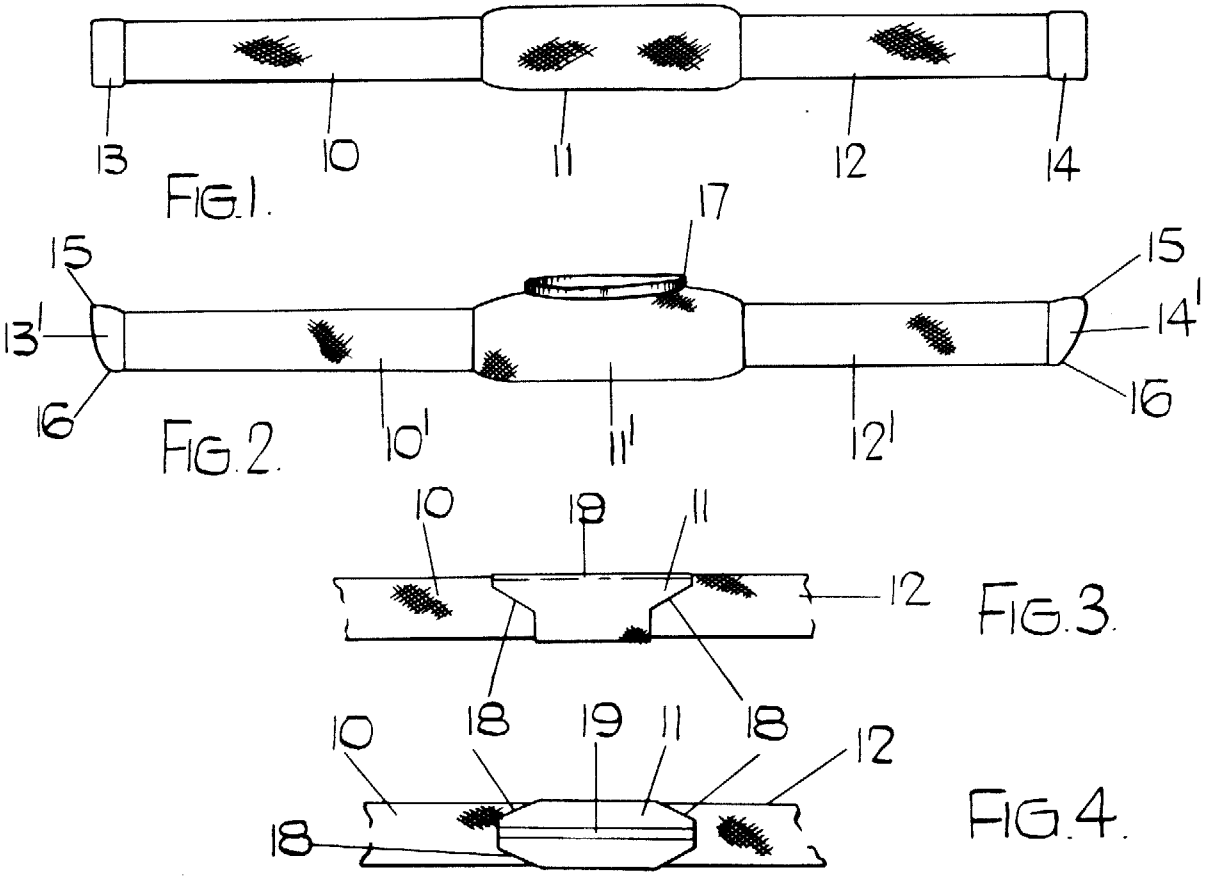
INVENTOR.
Martin Robert Johnson
BY Paul & Paul
ATTORNEYS.

KNIT GARMENT AND METHOD OF MANUFACTURE

Original Filed Jan. 10, 1969 2 Sheets-Sheet 2

INVENTOR.
Martin Robert Johnson

BY Paul + Paul
ATTORNEYS

United States Patent Office

Re. 27,886
Reissued Jan. 15, 1974

27,886

KNIT GARMENT AND METHOD OF MANUFACTURE

Martin Robert Johnson, Broughton Astley, England, assignor to Prenihan A.G., Chur, Switzerland Original No. 3,673,821, dated July 4, 1972, Ser. No. 790,363, Jan. 10, 1969. Application for reissue Jan. 31, 1973, Ser. No. 328,449
Claims priority, application Great Britain, Jan. 16, 1968, 2,414/68; Feb. 26, 1968, 9,278/68
Int. Cl. A41b *9/02*
U.S. Cl. 66—177 37 Claims

Matter enclosed in heavy brackets [ ] appears in the original patent but forms no part of this reissue specification; matter printed in italics indicates the additions made by reissue.

ABSTRACT OF THE DISCLOSURE

A two legged lower-body garment of the class comprising panti-hose, body stockings, leotards, tights, pantaloons, and pants, is made from a single blank of essentially seamless tubular form throughout knitted on a circular knitting machine and comprising two leg portions and an intermediate pant-forming portion. A waist opening is made in the waist portion; toes may be formed by cutting and seaming, or automatically on the knitting machine. At least the intermediate portion and preferably each portion is knitted of stretchable yarn which may be stretch yarn of elastomeric yarn. If of stretch yarn, the garment may be unboarded but may be given a relaxing treatment.

CROSS REFERENCES TO RELATED APPLICATIONS

Reference is made to the following British patent applications, from which priority is claimed:

No. 2,414/68 of Jan. 16, 1968
No. 9,278/68 of Feb. 26, 1968 each in the joint names of Ridley, Spriggs and Johnson Limited and Martin Robert Johnson. (Assignors to Pretty Polly Limited.)

This invention concerns a two-legged lower-body garment or nether garment of the type comprising an upper knitted part or body portion adapted to fit around the waist and the lower part of the trunk and beneath the crotch of the wearer and a depending pair of legs knitted integrally with the body portion. It is particularly concerned with garments of the class comprising panti-hose, body stockings, leotards, tights, pantaloons having full-length legs, and pants having legs reaching to just above or just below the knee of the wearer.

In substance garments of the class referred to, as commonly constructed, consist of a pair of long stockings united at their upper ends to panties, and prior to the present invention each garment has consisted of a plurality of shaped blanks seamed together and in the finished condition has been of bifurcated form with the legs extending side-by-side. These garments have usually been made by the successive steps of knitting, separately, a pair of stockings of extra length, subsequently cutting the inner sides of the welt-to-thigh portions of these stockings longitudinally, and thereafter seaming the cut edges either wholly to appropriate edges of a separately-produced interposed gusset or partly to a gusset and partly to one another. As hereinafter appears an object of the present invention is a method by which a garment of the type or class specified can be made less expensively. A further object is a method by which it can be made from a single blank of essentially seamless tubular form throughout. A further object is a garment capable of fitting a wide range of human anatomy sizes, and a method of its manufacture. The invention provides a method of making nether garment of the type specified, and particularly a garment of the class referred to which comprises knitting three integral seamless tubular portions in continuation of one another, viz. a first leg portion, an intermediate portion for eventually forming the pant portion, and a second leg portion, and providing a waist opening in said intermediate portion. In the finished garment the three said portions may be substantially aligned when not in wear. Desirably, at least the intermediate portion is knitted wholly or in the main of stretchable yarn and this permits it to conform to the lower body of the wearer and permits the legs, in wear, to extend substantially side-by-side.

The expression "stretchable yarn" includes stretch yarn and elastomeric yarn. A stretch yarn is a yarn made from thermoplastic fiber or fibers, usually in continuous filament form, which is capable of a pronounced degree of elongation and a rapid recovery, this property having been conferred on the yarn by it having been subjected to an appropriate combination of deforming, heat setting, and developing treatments. The expression includes crimped yarn, torque yarn, and non-torque yarn. It is preferred to employ stretch yarns having S and Z twist or false twist knitted in an alternating sequence, or a knit-de-knit yarn. Typical examples of suitable elastomeric yarns are sold under the registered trademarks "Lycra" and "Spanzelle" and under the designations "Glo-Span" and "Blue C."

The waist opening may be formed during the knitting operation, or subsequent thereto.

This invention also includes the garment itself and the one-piece blank therefor.

In order that the invention may be better understood, reference will now be made to the accompanying drawing in which:

FIG. 1 shows one form of the blank according to the invention;

FIG. 2 shows one form of completed garment, of the class referred to, according to the invention;

FIGS. 3 and 4 are views, looking in directions at right angles to one another, illustrating modifications;

Figure 5:
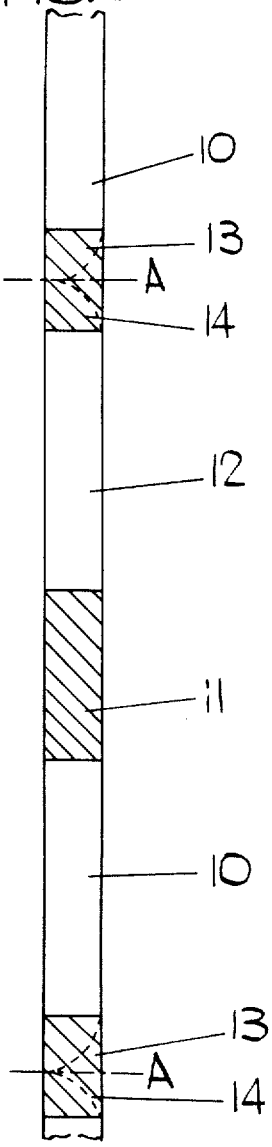
FIG. 5 illustrates the manufacture of the blanks in continuous string form.

The blank shown in FIG. 1 consists of three integral and substantially-aligned seamless tubular portions, viz. a leg and foot portion 10, a pant-forming portion 11, and a second leg and foot portion 12. Portion 11 is knitted wholly or in the main of stretch yarn and portions 10 and 12 are preferably but not necessarily knitted wholly or in the main of stretch yarn. The blank is knitted on a circular knitting machine so that it has the same number of wales throughout. The portions 10 and 12 may be shaped slightly by the known process of "stiffening", i.e., "fashioning," commonly employed in the manufacture of ladies' stockings. The pant portion 11 may be knitted of somewhat stouter yarn or yarns than those of which the portions 10, 12 are wholly or in the main knitted, and this results in the portion 11 being of slightly increased diameter. Alternatively or in addition the diameter of portion 11 may be increased by knitting it with slacker (longer) stitches and, specifically it may be knitted with slack courses alternating with less-slack courses. The latter assist in knocking-over the slack courses. Alternatively, portion 11 may be knitted of a yarn having a still-greater capacity for stretch. At their open outer ends the portions 10, 12 may themselves incorporate two seamless parts 13, 14 knitted of stretchable yarns of somewhat stouter character. Thus the pant portion 11, and parts 13 and 14 may be knitted of continuous filament torque yarns 40 denier and S and Z twist, and the main length of portions 10, 12 knitted of 20 denier S and Z twist yarns so as to have a sheer and translucent appearance. Portion 11, or portions 10 and 12, or all three portions may be knitted in micro-mesh or a non-run knitted structure.

As illustrated in FIG. 5, a succession of blanks can be knitted in continuous strong form as a continuous tube in which the parts 13, 14 of consecutive blanks are continuous with one another. The tube is eventually separated at regions A into the separate blanks. The cutting and seaming of the toes may be effected at the time of separation, or subsequently.

A suitable circular knitting machine has a diameter of over 3 inches and the number of needles is 80–474. Specifically the machine may be 4½-inch diameter and the number of needles 408.

A suitable knitting specification is as follows:

| Region: | Courses |
|---|---|
| Make-up | 8 |
| Waste | 72 |
| Toe portion | 264 |
| Leg | 2136 |
| Pant portion | 1584 |
| Leg | 2136 |
| Toe portion | 264 |
| Waste | 4 |

It will, of course, be understood that the diameter and gauge of the machine is chosen in accordance with the size of yarns to be employed and the desired size of the finished garment.

After the blank has been removed from the machine the open end of each portion 13, 14 is cut and seamed between the points 15, 16 to an appropriate toe shape. The toes of the garment are not necessarily of the shape shown; for example each toe seam may extend in a direction substantially normal to the plane of the paper.

Figure 8:
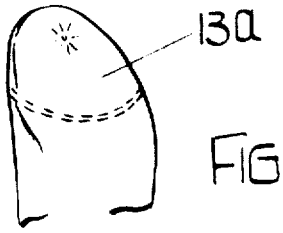
FIG. 8 illustrates an automatically-closed toe.

Instead of the toes being cut and seamed, they may be closed automatically on the knitting machine in the process of knitting the garment blank by adapting known methods of automatically closing the toes of stockings, and FIG. 8 illustrates such a toe in perspective at 13a. It will be seen that the toe is visually distinguished by radiating puckers or pleats.

A cut is also made in the portion 11 to provide a waist opening of appropriate size and this waist opening is provided with a sewn-on elasticated waist band 17. This last mentioned cut may be made as a slit in the wale-wise direction. A wale-wise guide line for the cut may be produced during knitting: for example by an appropriate recurrent stitch formation (e.g. a line of tuck stitches) or by preventing one or two needles knitting. Alternatively, an area of the fabric of a suitable shape and size may be cut out.

Desirably the cut extends for a given number of courses and not over a given fabric length. For this purpose, during knitting two markers may be produced on the portion 11 which markers are spaced apart by a pretermined number of courses so as to indicate the length to which the cut is to be made. These markers, which are conveniently in the form of coursewise bands, are visually distinguishable from the remainder of portion 11 and may be constituted by a stitch variation or yarn color or shade variation. Specifically, on the region of each end of the portion 11 there may be a plurality of markers spaced a given number of courses apart. For example each end of the portion 11 may consist of a band of plain fabric having, at regular course intervals, one or two visually-distinguishable courses. These may be produced by introducing an additional yarn at, for example, every sixth course. Except for these plain bands, portion 11 may, like portions 10 and 12, be knitted in micro-mesh or run-resist structure.

The circumferential location of the wast opening, or the cut therefor (whether made subsequently to knitting or, as hereinafter described, during knitting) may be as required. For example it may be substantially aligned, wale-wise, with the tips of the toes or may be offset, circumferentially of the tube, from the aligned position.

The waist band 17 is preferably made of two-way stretch fabric and, before sewing-on, has a width of ¼ inch to 2 inches. Desirably it has a fixed length before sewing on, which therefore determines the size of the finished waist opening.

The garment illustrated in FIG. 2 comprises a body portion 11' and legs 10', 12' (with cut and seamed toes 13', 14') integral therewith and a waist opening with waist band 17.

If the garment is knitted wholly or in the main of stretch yarns it is desirable that the step of boarding (which is normally applied to stockings knitted of stretch yarns) shall be omitted, although the garments may be boarded if desired. The omission of the step of boarding has the advantage that any one garment is capable of fitting a very wide range of human sizes. The step of boarding stockings, knitted of stretch yarns, in which they are drawn onto boards or forms and while on them are subjected to heat (in the regions of 248° F. for nylon 6 and 257° F. for nylon 66) and moisture, sets the stockings to a given size and shape and inhibits the degree of stretch possessed by the stockings. While such a boarded stocking, knitted of stretch yarns, is capable of fitting a range of human leg and foot sizes, this range is limited. On the other hand, if as in the present invention, the step of boarding is omitted the range of human anatomy sizes the garment will fit is considerably increased.

The present garments are preferably subjected, in the greige, to a relaxing treatment effected under the action of heat and moisture which develops the stretch qualities of the yarn and enhances the capacity of the garments for elastic stretch and recovery. This relaxing treatment may be combined with a dyeing treatment.

This relaxing treatment may be effected while the garments are limp and untensioned and under conditions such that their elasticity is not reduced and such as not to heat-set the yarn. The temperature employed in this treatment should be less than the temperature at which the yarn has been pre-set and should not be substantially greater than 221° F. and may be below 203° F. For example the garments may be treated in a dyebath the temperature of which is raised in stages to a maximum of 185°–194° F.

In a specific example, for scouring and dyeing the garments, a Smith rotary drum dyer or similar machine may be employed. The garments, in limp and untensioned condition, are placed in mesh nets and then placed in equal proportions in each compartment of the drum, the latter having first been filled with cold water and the requisite amount of scouring and dispersing agents having been added. The garments are rotated in this cold bath for 20 minutes. The temperature of the bath is then progressively raised to 115° F. for over a period of 20 minutes.

At this temperature the dye chemicals are added, the bath being held at this temperature for a further 15 minutes after which its temperature is progressively raised from 140° F. over a period of 40 minutes. The bath is held at this temperature for a further 30 minutes, after which the garments are checked for shade.

Following dyeing, the garments are then cooled and rinsed while in the drum. They are then removed from the drum, subjected to hydro extraction, removed from the nets and dried (e.g. tray dried) at a suitable temperature, for example 200° F. The garments are then ready for wear. However, if desired the garments may be ironed to enhance their appearance.

Alternatively, a non-rotary dyer, in which the goods remain stationary and the dye liquor is circulated through them, may be employed.

In a further alternative, the relaxing treatment may be applied in an autoclave at super-atmospheric pressure, the garments being in untensioned condition.

While a relaxing and stretch-developing treatment according to any of the foregoing examples results in the garments having good stretch properties, it may result in their having a pleated or wrinkled appearance, unless they are subsequently ironed.

Therefore in another mode of relaxing treatment the garments may be placed on flat metal supports of such a size and shape as not to distend the garments, and while thereon are dyed in an autoclave at a temperature in the region of 203°–221° F. this temperature being held for a very brief period, say about 80 seconds. This contrasts with the temperature of 212°–233° F., and the duration of about 1½ hours, normally employed in dyeing stockings.

If desired, the waist slit may be cut and the elastic waistband 17 sewn in place following the relaxing and/or dyeing treatments.

The blank shown in FIG. 1 is knitted throughout by rotation. However, if desired each portion 10, 12 may be formed with a heel pouch produced by narrowing and widening in a manner known in itself, (e.g. during reciprocation). Alternatively, heel pouches may be formed by the introduction of spaced partial courses during rotational knitting. A partial course is a course which does not extend for the full circumference of the tube. Alternatively, each heel area may be reinforced by part-round splicing with a splicing yarn which itself may be a stretch yarn such for example as false twist yarn, each spliced area being suitably shaped. Since the introduction of partial courses, or of part-round splicing, is effected during rotational knitting it is necessary either to avoid the formation of floats, or to cut them out as knitting proceeds, or to cut them out after knitting has been finished, in known manner. An area of each portion 10, 12 corresponding to the sole of the foot may be reinforced by splicing.

In a modification illustrated in FIG. 3 the margins 18 whereat the portion 10 and 12 are united to the portion 11, are, for at least a part of their length, diagonal to the wales and courses. To achieve this the same yarns that are employed for the portions 10 and 12 are continued through the portion 11 but are supplemented by a splicing or reinforcing yarn which may be a stretch yarn. At the commencement of the portion 11 this additional yarn produces part-round splicing the arc of which progressively increases until the additional yarn is knitted by all the needles. At the other end of portion 11 the reverse procedure is adopted. A wale-wise band 19 of part-round splicing, of a still further stretch yarn, may be provided along part 11. It is within this band 19 that the waist opening is to be cut. Floats of the added yarn or yarns must be avoided or cut out. Although this band is shown as extending for the full length of portion 11, it can stop short of the ends of this portion. This band 19 can be knit of elastomeric or rubber yarn so as to provide, when cut along its center line, the waist band 17, the cut edges being suitable finished-off and, if necessary, the band being suitable reinforced (e.g. by stitching) at the ends of the cut to prevent the latter spreading.

When the garment so far described is not being worn, the three portions 10, 11, 12 are in substantial alignment. Some divergence from this alignment may be provided by the modification illustrated in FIG. 6.

Figure 6:
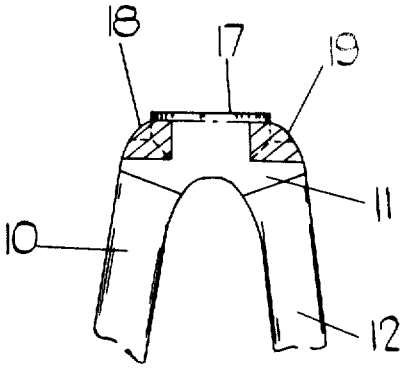
FIG. 6 shows a modified garment, substantially as worn.

In FIG. 6 two pouches 18 and 19, resembling heel pouches, are knitted in the portion 11 at the hip regions and extend over the same arc of circumference of said portion. They provide additional fabric in these regions which produces some divergence of the leg portions from alignment with portion 11, each pouch being symmetrically disposed with regard to the waist-opening cut. These pouches may be produced by narrowing and widening, following any pattern known for heel pouches, during reciprocatory knitting or by the introduction of partial courses during rotary knitting.

Each of them may be symmetrical with respect to a central wale, or axis of symmetry, or may be asymmetrical. If they are symmetrical, the line of the waist slit may coincide with, or may be displaced from, the axis of symmetry.

Figure 7:
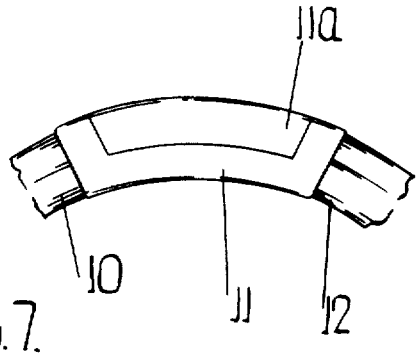
FIG. 7 illustrates a further modification.

Alternatively the portion 11 may be shaped by the introduction of spaced partial courses during circular knitting, thereby to ensure a greater length of fabric along the top of portion 11 as illustrated by the area 11a in FIG. 7. For example, in area 11a every third course may be a part-circular course knitted on some only of the needles, the intervening two courses being circular courses knitted on the full circle of needles. The waist cut may be made along the axis of symmetry of area 11a or along a line offset from the axis of symmetry.

It is within the scope of the invention to vary the frequency, and/or the circumferential length, of the partial courses. For example, in the case of a multi-feed machine, as knitting progresses from an end of portion 11 to the medial point in its length, a progressively-increasing number of the feeds may be controlled to produce partial courses of the same, or of progressively-changing length, the reverse procedure being adopted after passing the medial point. Thus, in the case of an eight-feeder machine (i.e. a machine having eight spaced feeding and knitting stations) knitting of portion 11 is commenced at all feeders; at a given stage one or more of these feeders are caused to produce partial courses while the remainder produce circular knitting and at a further stage one or more of these remaining feeders is caused to produce partial courses while the feeder or feeders still remaining produce circular knitting; this sequence is then reversed. The partial courses produced at one stage may have the same, or a different, circumferential length as the partial courses produced at the next stage. Alternatively, at a given stage some of the feeders continue to knit circular courses and the other feeders change to knitting partial courses of differing lengths. Thus, for example, in the case of an eight feeder machine, at the given stage two feeders continue to knit circular courses, two feeders knit partial courses of one length, two feeders knit partial courses of another length, and the remaining two feeders knit partial courses of a third length. In a further alternative, circular knitting can be commenced on a proportion of the feeders, the other feeders being introduced at a given stage, or progressively, to produce partial courses of differing lengths.

It will be understood that the blanks and garments herein described the wales extend lengthwise, and the courses extend width-wise (i.e. circumferentially) of portions 10, 11, 12, the number of the wales being constant. Such blanks may readily be knitted on a circular knitting machine of an appropriate diameter and with the appropriate number of needles. If the blank incorporates pouches knitted by narrowing and widening during reciprocation, the machine may be provided with conventional pouching mechanism: indeed a conventional seamless hose machine may be employed.

It has already been stated that the cut for the waist opening may be made during knitting. Thus the knitting machine may be equipped, at a predetermined location, with a cutter which cuts along a needle wale or sinker wale. For example there may be a needle having, on its shank, a projection formed with a cutting edge so that upon this needle being selectively raised to a height above its clearing height the edge cuts the head of a needle loop. Alternatively, a sinker having a cutting edge may be selectively projected inwards to cut the head of a sinker loop, or a cutting jack may be provided among the sinkers.

The reference to a garment or a desired part thereof being knitted wholly or in the main of stretch yarn or elastomeric yarn is not intended to preclude the alternation of courses of stretch yarn and courses of non-stretch or flat yarn in a desired sequence. For example, in a desired part of the garment balanced courses of S and Z yarn may be interspersed with courses of flat yarn. Thus a suitable repeating course sequence may be S, F, Z, F, or S, F, S, Z, F, Z, where each letter F indicates a course of flat yarn. A circular knitting machine having a plurality of yarn feeding and knitting stations, so that a plurality of courses is knitted at each revolution, may be employed.

It is the scope of the invention to knit the leg and foot portions 10, 12 of non-stretch yarn in which case at least these portions may be boarded or dye-boarded. Particularly in the case of a garment in which the portion 11 is knitted wholly or in the main of stretch yarn or elastomeric yarn and the leg portions 10, 12 of non-stretch yarn, the ends of the portions 10, 12 may be left open (i.e. the garment is without feet); such a construction is applicable to pantaloons and pants. The ends of the leg portions may be elasticated.

If the leg portions are "stiffened" then, since knitting commences at the toe end of one leg portion, the commencement is made with relatively small or tight stitches; these are made progressively slacker as knitting proceeds up the leg to the junction with the pant portion. The latter is knit with the same or slightly greater slackness and at or after the end of the pant portion is reached the slackness is progressively reduced as knitting proceeds down the other leg.

It will be appreciated that the garment according to the present invention is made in an inexpensive and rapid manner, is capable of fitting a wide range of human anatomy sizes, and provides a good fit in the body portion and legs.

What is claimed is:

1. A method of making a two-legged garment [of the class comprising panti-hose, leotards, tights, body stockings and the like] having a pant portion for enclosing the lower part of the trunk and extending beneath the crotch of the wearer and a pair of integral legs each terminating in a foot having a closed toe, said pant portion having a waist opening, which method includes a. knitting, as a continuous seamless tube, three integral tubular portions viz.: a first leg portion, an intermediate portion for eventually forming the pant portion and then a second leg portion, b. said seamless tube being rotary knitted substantially throughout, to form a continuous seamless tube of knitted wales all of which extend continuously throughout the tube, c. and closing the toes of the garment.

2. A method according to claim 1 which comprises knitting at least the pant portion with stretchable yarn.

3. A method according to claim 2 which comprises knitting the leg portions with stretchable yarn.

4. A method according to claim 1 which comprises knitting at least the pant portion with stretch yarn.

5. A method according to claim 1, which comprises knitting at least the leg portions with stretch yarn.

6. A method according to claim 1, in which each of the three integral portions is knitted, at least in the main, of stretch yarn, and the garment is subject, while in limp and untensioned condition, to a relaxing treatment effected under the action of heat and moisture which develops the stretch qualities of the yarn and enhances the capacity of the garment for elastic stretch and recovery.

7. A method according to claim 1, including the step of applying a stretchable waist band to the waist opening.

8. A method according to claim 1, including the steps of knitting, into the pant portion, two markers which are spaced apart by a predetermined number of courses, and subsequently cutting the waist opening to a length determined by the spacing of the markers.

9. A two-legged garment [of the class comprising panti-hose, leotards, tights, body stockings and the like, said garment] having a pant portion for enclosing the lower part of the trunk and extending beneath the crotch of the wearer and a pair of integral legs each terminating in a foot having a closed toe, said pant portion having a waist opening, which garment comprises a single continuous seamless knitted tube forming the pant portion and the legs and the feet, with all the knitted wales of the legs and the feet extending through said legs and feet into the pant portion and with the knitted courses extending circumferentially of said tube.

10. A garment according to claim 9, wherein at least the pant portion is knitted with stretchable yarn.

11. A garment according to claim 10, wherein the stretchable yarn is stretch yarn.

12. A garment according to claim 9, having the legs knitted with stretchable yarn.

13. A garment according to claim 12, wherein the stretchable yarn is stretch yarn.

14. A garment according to claim 9, having the legs and the pant portion knitted with stretch yarn, which garment is characterized in that it is unboarded.

15. A garment according to claim 9, having the waist opening constituted by a wale-wise extending interruption in the tubular form of the pant portion and provided with an elastic waist band.

16. A garment according to claim 9, which is knitted at least in the main, of stretchable yarn, the legs are substantially aligned with the tubular pant portion at opposite ends of the latter and the elasticity of the pant portion affords a capacity for stretch in the latter which permits the legs to extend side by side in wear, the tubular form of the pant portion is interrupted by a longitudinal slit providing the waist opening, which opening is elasticated.

17. A blank for a garment according to claim 9, constituted by a seamless tube comprising three integral tubular portions viz, a first leg portion, an intermediate portion suitable for eventually forming the pant portion of the garment, and a second leg portion, the length of which leg portions is greater than that of the intermediate portion and is adequate to provide the legs and feet of the garment, the wales of which tube extend continuously through the three portions, the intermediate portion being knitted at least in the main of stretchable yarn and the leg portions being knitted at least in the main of stretch yarn.

18. A method of manufacturing a seamless panty hose type garment comprising the steps of (a) knitting a tubular party hose blank on a circular knitting machine by continuous unidirectional rotary knitting from one end of the garment type blank to the other end and while, (b) knitting a first leg portion by first forming integrally knit toe, foot, ankle sections, lower and upper leg sections, (c) knitting a medial panty portion, (d) knitting a second leg portion by forming integrally knit second upper and lower leg sections, second ankle, foot and toe sections, (e) slitting said medial portion of said panty hose blank in a walewise direction and along one side for a predetermined distance to form a waist opening therein.

19. A one piece seamless unidirectional rotary knitted panty hose garment having wales and courses therein comprising a seamless tubular panty portion integrally knitted having an upper waist opening, said seamless panty portion having integrally knitted seamless downwardly depending leg portions defining a crotch portion therebetween, said garment having an area from said waist opening down to and including said crotch portion wherein all the wales therein extend uninterrupted from the lower part of one leg portion through said area and down to the lower portion of the other of said leg portions.

*20. A method according to claim 1, further including the steps of knitting the intermediate portion of the seamless tube to provide an upper section and a lower crotch section, and knitting partial courses in the upper section to impart a longitudinal curvature to the intermediate portion of the tube.*

*21. A method according to claim 1, including knitting the intermediate portion of the seamless tube to provide an upper section and lower crotch section, and knitting partial courses in the upper section to impart a longitudinal curvature to the intermediate portion of the tube.*

*22. A method according to claim 1, further including the steps of knitting a curved intemediate portion of the seamless tube having a convex upper section and a concave lower crotch section, and slitting the upper section to form a waist opening therein.*

*23. A garment according to claim 9, wherein the pant portion is curved longitudinally and includes a concave crotch area extending between the legs.*

*24. A garment according to claim 9, wherein the pant portion is curved longitudinally and includes an upper area and a lower concave crotch area extending between the legs, and wherein the upper area contains partial courses.*

*25. A garment according to claim 9, wherein the pant portion is curved longitudinally and has an upper convex portion and a lower concave crotch portion, and the upper portion of the pant portion contains a plurality of partial courses to impart a convex curvature thereto.*

*26. A garment blank according to claim 9, constituted by a seamless tube comprising three integral tubular portions, viz. a first leg portion, an intermediate portion for providing the pant portion of the garment, said intermediate portion being curved longitudinally and including a concave crotch area, and a second leg portion, the length of which leg portions is greater than that of the intermediate portion and is adequate to provide the legs and feet of the garment, the wales of which tube extend continuously through the three portions.*

*27. A garment according to claim 9, wherein the pant portion has margins which, for at least part of their length, are diagonal to the wales and courses and converge downwardly.*

*28. A garment according to claim 9, wherein the pant portion incorporates part-round splicing.*

*29. A garment according to claim 9, wherein the legs are void of heel pouches.*

*30. A garment according to claim 9, wherein the legs have reinforced heel areas.*

*31. The method of claim 18 further including the step of knitting a curved medial panty portion having a convex upper section and a concave lower crotch section, to impart a continuous longitudinal curvature to said panty portion.*

*32. The method of claim 31 further including the step of knitting partial courses in the convex upper section.*

*33. The garment of claim 19 wherein the panty portion is curved longitudinally and the crotch portion is of concave configuration.*

*34. The garment of claim 19 wherein the upper area of the panty portion incorporates spaced partial courses.*

*35. A two-legged garment having a pant portion for enclosing the lower part of the trunk and extending beneath the crotch of the wearer and an integral pair of legs, said pant portion having a waist opening provided with an elasticated waistband, which garment comprises a single knitted blank forming the pant portion and the legs and has*

*(a) all the wales of the legs extending through the pant portion and with the courses of the legs extending circumferentially thereof,*

*(b) the elasticated waistband knitted integrally with the pant portion and*

*(c) the courses of the pant portion extending through the waistband.*

*36. A garment according to claim 35, wherein wales of the legs extend through the waistband.*

*37. A method for the manufacture of a two-legged garment having legs integral with a medial pant portion and the latter having a waist opening provided with an elasticated fabric waistband, comprising the steps of:*

*(a) knitting a garment blank on a circular knitting machine, from one end of the blank to the other, by first knitting a first seamless leg portion, then knitting a medial pant portion in continuation of said first leg portion, and then knitting a second seamless leg portion in continuation of the pant portion,*

*(b) providing elasticated knitted fabric for the waistband by knitting said fabric integrally with the pant portion during the knitting of the latter, and,*

*(c) during the knitting of the blank from one end to the other, continuing the wales of the first leg portion into and through said pant portion, including said elasticated fabric, and into and through said second leg portion.*

References Cited

The following references, cited by the Examiner, are of record in the patented file of this patent or the original patent.

UNITED STATES PATENTS

| | | | |
|---|---|---|---|
| 256,532 | 4/1882 | Appleton | 66—177 |
| 402,202 | 4/1882 | Sutton | 66—177 |
| 2,560,580 | 7/1951 | Lacks | 66—177 |
| 2,962,884 | 12/1960 | Garrou et al. | 66—177 |
| 3,075,375 | 1/1963 | Garrou et al. | 66—177 |
| 3,109,300 | 11/1963 | Garrou et al. | 66—177 |
| 3,109,301 | 11/1963 | Garrou et al. | 66—177 |
| Re. 26,581 | 3/1969 | Currier | 66—187 |

FOREIGN PATENTS

| | | | |
|---|---|---|---|
| 1,046,337 | 12/1953 | France | 2—90 |
| 1,094,103 | 12/1967 | Great Britain | 66—176 |

RONALD FELDBAUM, Primary Examiner

U.S. Cl. X.R.

2—224